UNITED STATES PATENT OFFICE.

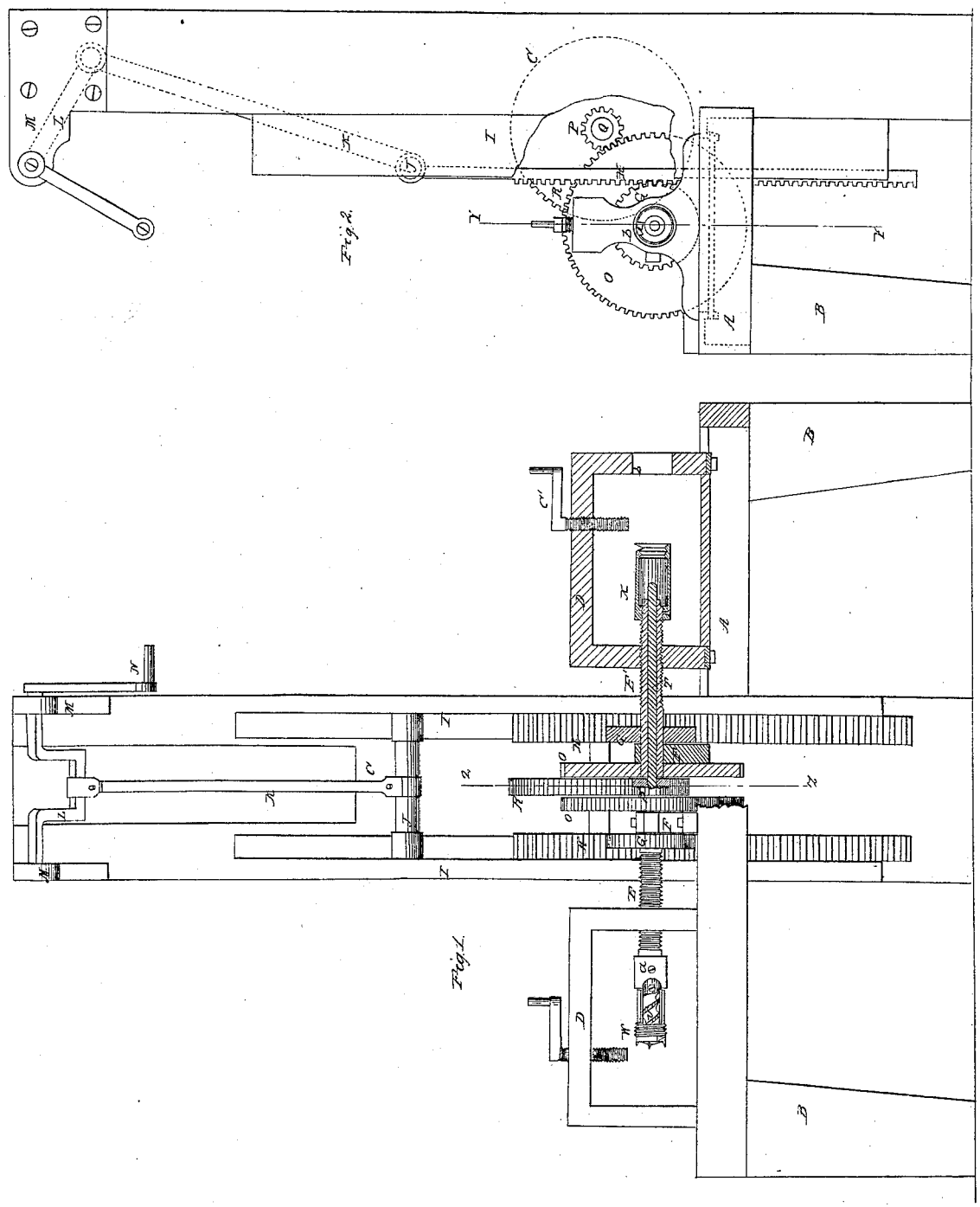

ABNER H. LONGLEY, OF LEBANON, INDIANA.

IMPROVEMENT IN MACHINES FOR CUTTING WOODEN SCREWS.

Specification forming part of Letters Patent No. 9,729, dated May 17, 1853.

*To all whom it may concern:*

Be it known that I, ABNER H. LONGLEY, of Lebanon, in the county of Boone and State of Indiana, have invented a new, useful, and Improved Machine for Boring and Cutting Screws for Bedsteads and other Articles; and I do hereby declare that the same is described and represented in the following specification and accompanying drawings.

The nature of my invention consists of an auger arranged to operate inside of the screw-cutting apparatus or a reducing-tool to make a tenon in front of a screw-cutting apparatus, so as to bore the hole or make the tenon and cut the screw in it or upon it at one and the same operation, and thereby save twenty-five per cent. of the labor required to do the same work by the machines heretofore used for that purpose.

To enable others skilled in the art to make and use my invention, I will proceed to describe its construction and operation, referring to the above-mentioned drawings, in which the same letters indicate like parts in each figure.

Figure 1 is a front elevation of the machine with that portion to the right of the line $z\,z$ represented as cut perpendicularly through the line $y\,y$ of Fig. 2. Fig. 2 is an end elevation, some portions of which are represented as broken away to show others.

A is a strong frame supported by the legs B B and post C, to which frame A the head-stocks D D, constructed in the form represented, are fitted to traverse when operated by the screws E E', which screws are fitted to turn in the boxes F F, fastened to the frame A, as represented. There is a gear G G fastened to each of the screws, so as to turn them by traversing the racks H H, which racks slide in the cleats I I, fastened to the post C for that purpose. The racks H H are connected by the bar J, which is operated by the connecting-rod K, which connects it to the crank L, which turns in the boxes M M, fastened to the post C, as represented, and a pulley or gear may be fastened to it, or it may be operated by the hand-winch N. There are two other gears O O, fastened to the screws E E, which drive the pinions P, fastened to the shaft Q, which shaft turns in boxes fastened to the post C and carries the large gear R, which drives the pinion S upon the shaft T, which shaft extends through both of the screws E E', which are bored out for that purpose, as represented in the right-hand portion of Fig. 1.

The auger U is provided with a socket to fit the end of the shaft T, to which it is fastened by a set-screw, as represented, so as to turn inside of a screw-tap W and bore a hole for the tap W, which follows it and cuts a screw-thread in the hole bored by the auger U, the tap W being fastened to the screw E by the screw $a$.

The screw E' has a socket or die X fastened to it by a set-screw, which die is fitted with a V to cut the male screws upon the ends of the rails, which are first rounded of a proper size where the screw is to be cut and then inserted in the hole $b$ in the head-stock, and a block of wood with a score in it may be put under it to hold it at a proper height, and the screw $c$ is turned down upon it to fasten it securely while the screw is cut upon the end of the rail by turning the screw E', which traverse the head-stock and rail, while the V in the socket X cuts the screw upon the rail.

To cut the screw in the post, the socket X is removed and a tap fastened to the screw E' and an auger to the end of the shaft T, so as to bore the hole and cut the screw in the post at the same time, the post being placed in the head-stock and secured by the screw $c$ while it is being bored and cut. One of the screws which traverses the head-stocks is right hand and the other left, so that the male and female screws cut in one head-stock will be right hand and those cut in the other head-stock will be left hand, so that a rail may be cut with a right-hand screw on one end in one head-stock and a left-hand screw upon the opposite end in the other head-stock and the posts cut to fit it, so that it may be screwed into both posts at the same time.

It is apparent from the foregoing description that my apparatus will bore a hole and cut a screw in it at the same time, and I contemplate that a tubular shaft may be arranged to revolve outside of the socket X at an increased speed with a knife or knives fastened to the end, so as to reduce the end of the rail or other article upon which the screw is cut in advance of the socket or screw-cutting apparatus, so as to reduce the end of the rail to the size required for the screw and cut the screw at one and the same operation, so as to save the labor of handling the lumber of which the bedstead or other article is made so many times as it is required when the screws are cut by such machines as have been made heretofore.

What I claim as my invention, and desire to secure by Letters Patent, is—

Giving an equal progressive motion to the cutting-tools, in combination with a differential rotary motion for the purpose of cutting the screws at the same time the hole is bored or the tenon is made, in the manner and for the purposes set forth, substantially as described.

In testimony whereof I have hereunto signed my name before two subscribing witnesses.

ABNER H. LONGLEY.

Witnesses:
   ISAAC COOMBS,
   CHANCY KING.